(12) United States Patent
English

(10) Patent No.: US 8,479,065 B2
(45) Date of Patent: Jul. 2, 2013

(54) ADAPTIVE, WIRELESS AUTOMATIC IDENTIFICATION SYSTEM PILOT PORT INTERFACE

(75) Inventor: Donald W. English, El Cajon, CA (US)

(73) Assignee: Arinc Incorporated, Annapolis, MD (US)

( * ) Notice: Subject to any disclaimer, the term of this patent is extended or adjusted under 35 U.S.C. 154(b) by 127 days.

(21) Appl. No.: 13/287,724

(22) Filed: Nov. 2, 2011

(65) Prior Publication Data

US 2013/0111284 A1    May 2, 2013

(51) Int. Cl.
*G01R 31/28* (2006.01)
(52) U.S. Cl.
USPC ............................... 714/724; 714/703
(58) Field of Classification Search
USPC ............ 348/211.3; 455/73; 713/400; 714/47, 714/724, 703
See application file for complete search history.

(56) References Cited

U.S. PATENT DOCUMENTS

| | | | |
|---|---|---|---|
| 516,498 A | 3/1894 | Lewis | |
| 3,273,039 A | 9/1966 | Godshalk et al. | |
| 4,400,658 A | 8/1983 | Yates | |
| 4,414,632 A * | 11/1983 | Murrell | 702/70 |
| 4,434,324 A | 2/1984 | Boggio et al. | |
| 5,182,466 A | 1/1993 | Ohkubo | |
| 5,191,507 A | 3/1993 | Saito | |
| 5,194,758 A | 3/1993 | Ver Meer | |
| 5,551,016 A * | 8/1996 | Loeb et al. | 713/400 |
| 5,727,006 A | 3/1998 | Dreyer et al. | |
| 5,760,591 A | 6/1998 | Matsuda et al. | |
| 6,011,957 A * | 1/2000 | Culbertson et al. | 455/73 |
| 6,349,394 B1 * | 2/2002 | Brock et al. | 714/47.2 |
| 6,417,581 B2 | 7/2002 | Hall et al. | |
| 7,110,239 B2 | 9/2006 | Berkey | |
| 7,130,274 B2 | 10/2006 | Chang et al. | |
| 7,623,157 B2 * | 11/2009 | Berkey | 348/211.3 |
| 2009/0279635 A1 | 11/2009 | Kinnaird | |
| 2011/0085617 A1 | 4/2011 | Davis et al. | |

* cited by examiner

*Primary Examiner* — David Ton
(74) *Attorney, Agent, or Firm* — Ronald E. Prass, Jr.; Prass LLP

(57) ABSTRACT

A remotely-accessible electronic circuit is provided, which, in wireless communication with a maritime pilot's Personal Pilot Unit (PPU), or other remote computer, is able to identify a common mis-wiring of an Automatic Identification System (AIS) Pilot Port in a maritime vessel. The circuit then is remotely controlled to electronically manipulate the connections that provide raw transmit and receive signals from the AIS Pilot Port. The electronic manipulation corrects the common mis-wiring without actual physical intervention of the pilot with the AIS Pilot Port, or other mechanical interface between that port and the pilot's PPU.

21 Claims, 3 Drawing Sheets

ADAPTIVE, WIRELESS AUTOMATIC IDENTIFICATION SYSTEM PILOT PORT INTERFACE

BACKGROUND

1. Field of the Disclosed Embodiments

This disclosure relates to systems and methods for remotely diagnosing and correcting for errors in wiring in an Automatic Identification System Pilot Port.

2. Related Art

The Automatic Identification System (AIS) is an automated maritime vessel tracking system used on ships for identifying and locating vessels within a vicinity of one's own vessel by electronically exchanging data with nearby vessels. The AIS augments radar and visual lookouts and is based on radio transponders that pass unique identification, position, course and speed information regarding one's own vessel and the vessels in the area of one's own vessel between the vessels.

The U.S. Coast Guard requires commercial vessels to carry AIS radios. See, e.g., 33 C.F.R. §164.46 entitled "Automatic Identification System (AIS)." This section of the Code of Federal Regulations ("Rules") specifies, among other things, what is considered to be a proper installation for an AIS radio in a vessel. In order to determine the requirements for a proper installation, the Rules refer to a document from the International Maritime Organization entitled "Guidelines For The Installation Of A Shipborne Automatic Identification System (AIS)." See IMO SN/Circ. 227 dated Jan. 6, 2003. The IMO document provides that "[a] pilot input/output port is part of an AIS Class A station. A plug connected to this port should be installed on the bridge near the pilot's operating position so that a pilot can connect a Personal Pilot Unit (PPU)." Id. at §3.2. According to the referenced proper installation for the AIS, the Coast Guard requires vessels with an AIS radio to provide this interface to the AIS radio according to the input/output port requirements set forth in the IMO document. The standard shipboard AIS will be fitted with this pilot/auxiliary input/output port, which will allow the pilot, in his or her own workstation, to receive more frequent navigational information. In this installation, the pilot will receive all of the available AIS information and will be able to forward information to other vessels in the vicinity of the pilot's own vessel.

The port required by the Coast Guard for the AIS radio installation is a serial data interface, as defined by International Electronic Commission (IEC) International Standard 61162 (IEC 61162). This interface, which is commonly referred to as the "Pilot Port," is used by the professional maritime pilot to obtain the information from the AIS radio for display on the individual pilot's PPU. The display then provides a situational awareness overview regarding an own vessel and for vessels in the vicinity of the own vessel.

The AIS Pilot Port is a bi-directional RS-422 (ANSI/TIA/EIA-422-b) interface. The interface consists of a first pair of balanced differential (high and low) lines for receiving information, and a second pair of balanced differential (high and low) lines for transmitting information. Errors often occur in installation of the Pilot Port on a vessel. These errors may include installers reversing the receive and transmit lines. More often, however, it is the balanced differential lines that are reversed (high for low, or low for high).

The problem of mis-wiring is an all-too-common occurrence that negatively impacts the ability of the pilot to interface with the AIS radio. An ability to detect and immediately adjust for these mis-wirings is almost a necessity. The frequency of these mis-wirings has led to mechanical solutions being attempted in which the pilot (operator) may physically and locally manipulate one or more mechanical switches in a unit that is placed between the Pilot Port and the pilot's PPU. While this approach is effective, it requires that the pilot/operator monitor the status of the data from the AIS radio and physically manipulate the switches to achieve the correct data orientation. This is undesirable because it requires a "human-in-the-loop" and is a needless encumbrance on the pilot as the pilot is performing other piloting duties.

SUMMARY OF THE DISCLOSED EMBODIMENTS

It would be advantageous to take the conventional mechanical solution a step farther and to provide a system and a method that includes a capability to remotely detect and adapt for erroneous installations of the AIS Pilot Port through electronic manipulation of the data exiting the AIS Pilot Port for use in the pilot's PPU.

In various exemplary embodiments, the systems and methods according to this disclosure may advantageously provide a remotely-accessible electronic circuit in wireless communication with the PPU, or other remote computer, the circuit being usable to by identify a common mis-wiring of the AIS Pilot Port and to electronically manipulate the connections without actual physical intervention of the pilot with the AIS Pilot Port, or other mechanical interface between that port and the pilot's PPU.

In various exemplary embodiments, the systems and methods according to this disclosure may provide a remotely-accessible circuit according to a specific design which, with the aid of an external program, may detect and resolve a common mis-wiring in the installation of an AIS Pilot Port in a specific vessel.

In various exemplary embodiments, the systems and methods according to this disclosure may provide a unique design for an electronic circuit that converts raw signals of both the receive and transmit lines from the RS-422 to transistor-transistor logic (TTL) levels. In such a circuit, data will only be present on one of the two paths, either the receive path or the transmit path. The receive and transmit lines may be advantageously exclusively OR-ed together via a first exclusive OR gate (XOR1). In this manner, the situation where the receive and transmit lines are swapped may be corrected by the circuit. The resulting output of XOR1 may be in an inverted or in an uninverted orientation depending on the Pilot Port's wiring of the receive (Rx+ and Rx−) lines, or the transmit (Tx+ and Tx−) lines, as applicable.

In various exemplary embodiments, the systems and methods according to this disclosure may provide a further unique design for the electronic circuit in which an output of the XOR1 gate may then be exclusive OR-ed via a second exclusive OR gate (XOR2) with a control line, such as, for example, from a Bluetooth interface module. The serial data output from the XOR 2 gate may then be input to a wireless transmission device, such as, for example the Bluetooth interface module. The serial data may be then wirelessly transmitted to a remote computer.

In various exemplary embodiments, the systems and methods according to this disclosure may provide a capability in which the remote computer executes a program to monitor data received from the wireless interface device. The computer program may detect an inversion in the received data. In such a circumstance, the computer program may transmit a control signal to automatically assert the control line from the Bluetooth interface module to re-invert the data at XOR2 resulting in a correct signal exiting the circuit.

In various exemplary embodiments, the systems and methods according to this disclosure may provide a device that may include a circuit such as that described above, a wired connection such as, for example, a cable to connect the device/circuit to the AIS Pilot Port via a standardized connector, the wireless interface device (or Bluetooth interface module), an integral battery or external battery connection, at least one control switch to de-energize or energize the device, and some display capability to visually or audibly display at least a status of the device and/or of the data received.

These and other features, and advantages, of the disclosed systems and methods are described in, or apparent from, the following detailed description of various exemplary embodiments.

BRIEF DESCRIPTION OF THE DRAWINGS

Various exemplary embodiments of the disclosed to systems and methods for remotely diagnosing and correcting for errors in wiring in an Automatic Identification System Pilot Port will be described, in detail, with reference to the following drawings, in which.

DETAILED DESCRIPTION OF THE DISCLOSED EMBODIMENTS

The systems and methods for remotely diagnosing and correcting for errors in wiring in an Automatic Identification System Pilot Port according to this disclosure will generally refer to this specific utility for the disclosed systems and methods. Exemplary embodiments described and depicted in this disclosure should not be interpreted, however, as being specifically limited to any particular configuration, or directed to any particular intended use. In fact, any transmission circuit that may benefit from intervention with a circuit or device such as that generally described in this disclosure is contemplated.

Specific reference to, for example, any particular wireless interface device, such as a Bluetooth interface module, should be understood as being exemplary only, and not limiting, in any manner, to the disclosed system, circuit or device. Such an example is provided for clarity and ease of description and depiction. The systems and methods according to this disclosure will be described as being particularly adaptable to being controlled on remote computers, but should not be considered as being limited to only these devices.

Individual features and advantages of the disclosed systems and methods will be set forth in the description that follows, and will be, in part, obvious from the description, or may be learned by practice of the features described in this disclosure. The features and advantages of the systems and methods according to this disclosure may be realized and obtained by means of the individual elements and combinations of those elements as particularly pointed out in the appended claims. While specific implementations are discussed, it should again be understood that this is done for illustration purposes only. A person skilled in the relevant art will recognize that other components and configurations may be used without departing from the spirit and scope of the subject matter of this disclosure.

Various aspects of the disclosed embodiments relate to a circuit design that is adaptable for remotely diagnosing and correcting for errors in wiring in an Automatic Identification System Pilot Port.

Figure 1:
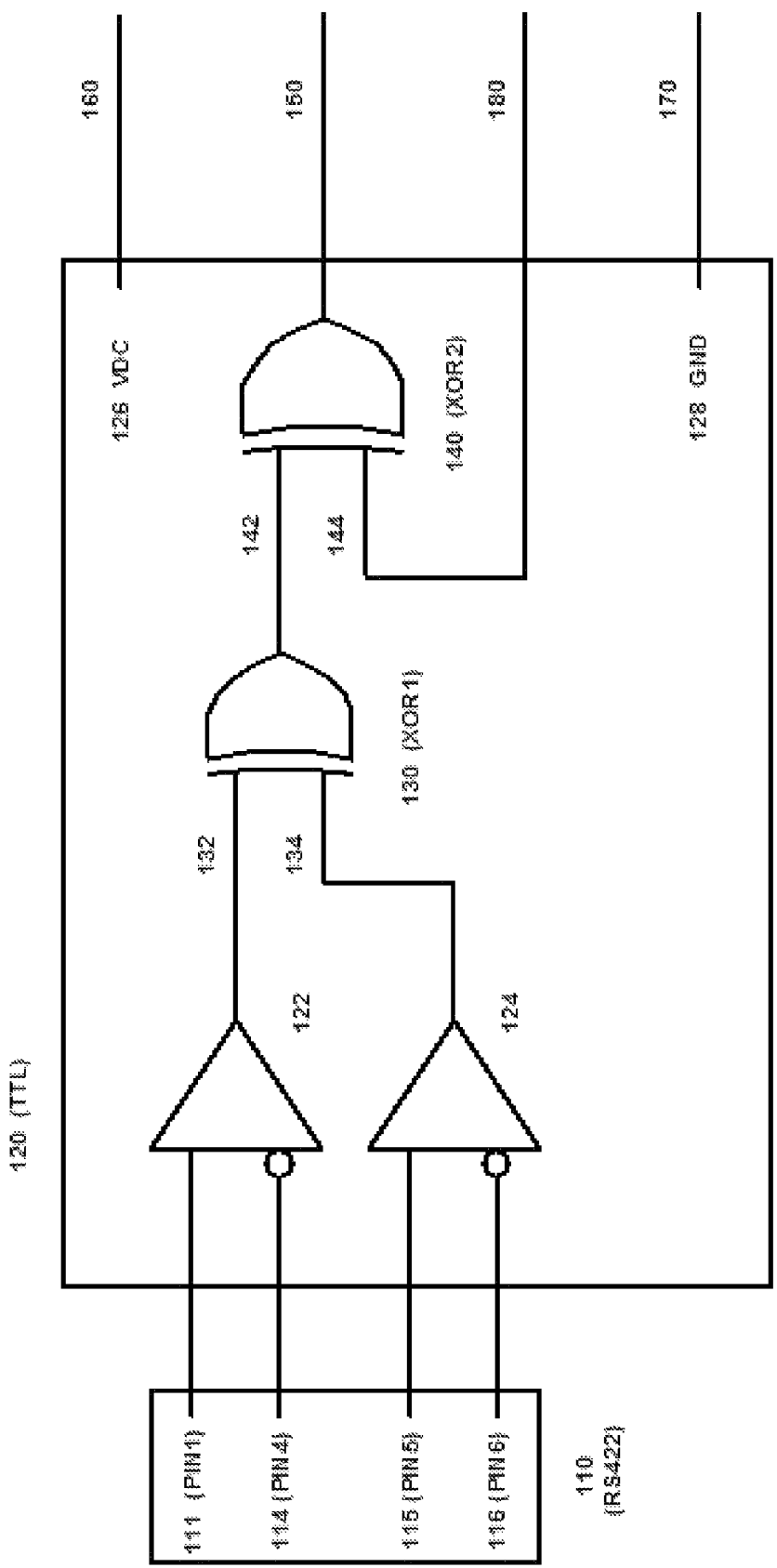
FIG. 1 illustrates an exemplary simplified circuit diagram of a circuit for adapting an AIS Pilot Port according to this disclosure.

FIG. 1 illustrates an exemplary simplified circuit diagram of a circuit for adapting an AIS Pilot Port according to this disclosure. As shown in FIG. 1, in the RS-422 connector 110, four of the pins 111, 114, 115, 116 (respectively corresponding to pin 1, pin 4, pin 5 and pin 6 of the RS-422 connector) may provide outputs from the AIS Pilot Port to the circuit. In a standard installation, pin 1 should transmit the balanced differential high signal (Tx+), pin 4 should transmit the balanced differential low signal (Tx−), pin 5 should receive the balanced differential low signal (Rx−) and pin 6 should receive the balanced differential high signal (Rx+).

The signals traversing pins 111, 114, 115, 116 may be fed to a transistor-transistor logic (TTL) circuit 120 in order that the RS 422 raw signals may be converted to TTL level signals. It should be noted that the exemplary TTL circuit 120 shown in FIG. 1 is a simplified diagram of a TTL circuit 120 including only the detail appropriate to adequately depict the concept embodied by this disclosure. Power may be delivered to the TTL circuit 120 from an external power source (not shown) via, for example, leads 160, 170 connected to power terminals connections 126, 128 in the TTL circuit 120. Serial data may be delivered from the TTL circuit via output line 150. A control line from a wireless interface device such as, for example, a Bluetooth interface module (not shown) may be provided via a control line 180.

Operation of the circuit will now be described in more detail. Raw signal data will only be present on one of the two paths, either transmit data (from pins 111 and 114) or receive data (from pins 115 and 116). This data is respectively passed to logic gates 122, 124 where it is converted to logic level signals. The outputs from logic gates 122, 124, as the respective transmit and receive logic level signals 132, 134 may be exclusively OR-ed together via a first exclusive OR gate 130 (XOR1). In this manner, the situation where the receive and transmit lines are swapped may be corrected by the circuit as the receive and transmit data signals are isolated.

A resulting output 142 of XOR1 gate 130 may be in an inverted or in an uninverted orientation depending on the Pilot Port's wiring of the transmit (Tx+ and Tx−) lines to pins 111, 114, or the receive (Rx+ and Rx−) lines to pins 116, 115, as applicable.

The resulting output 142 of XOR1 gate 130 may then be exclusive OR-ed via a second exclusive OR gate 140 (XOR2) with a signal 144 input on control line 180. If a remote computer in communication with the TTL circuit 120 detects that the data output from XOR2 140 on output line 150 is inverted, the computer will cause a signal to assert control line 180 to provide an asserted signal 144 to re-invert the data at XOR2 140.

Figure 2:
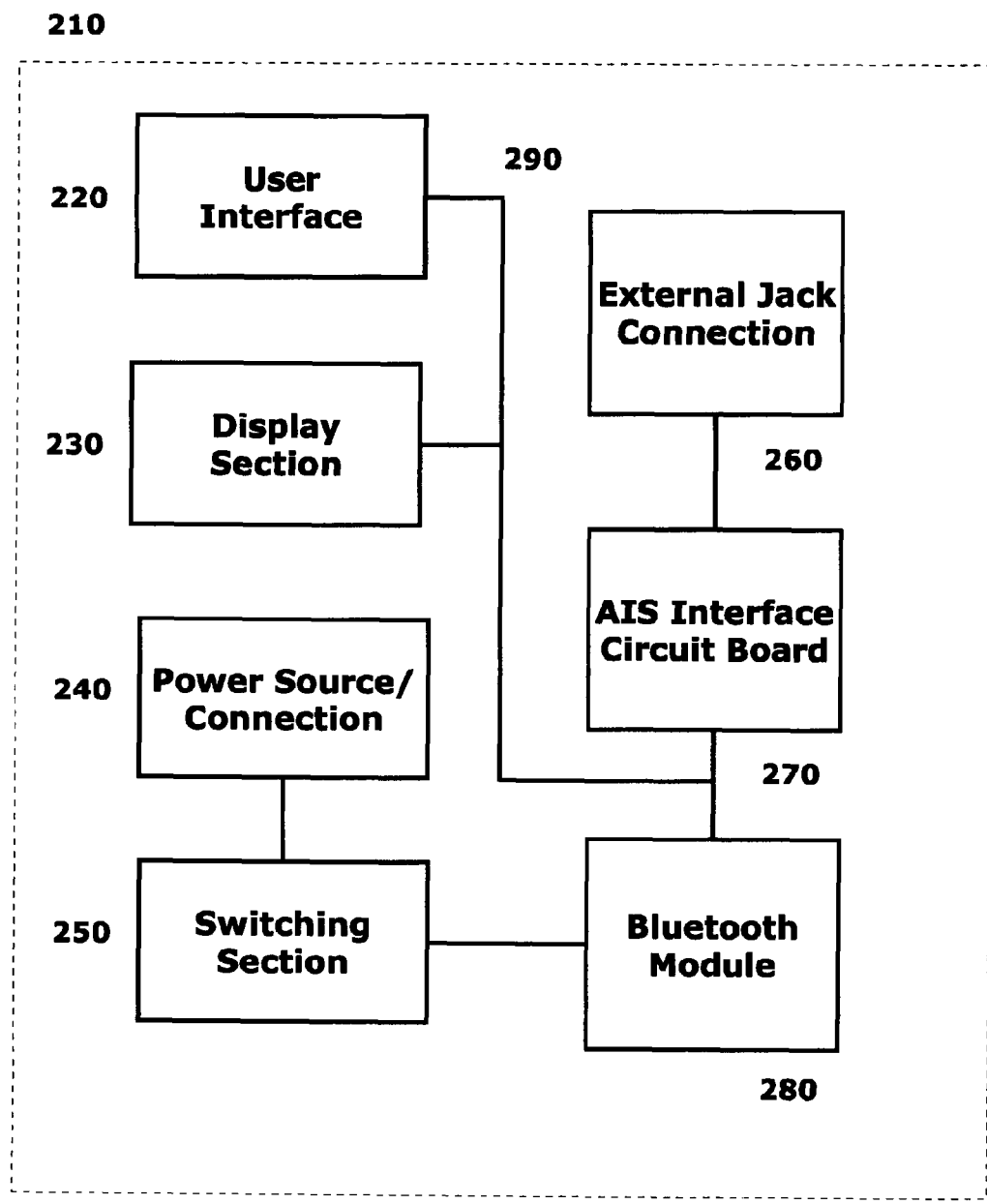
FIG. 2 illustrates a block diagram of an exemplary device that connects the exemplary circuit to the AIS Pilot Port according to this disclosure.

FIG. 2 illustrates a block diagram of an exemplary device that supports the circuit and connects the exemplary circuit shown in FIG. 1 to the AIS Pilot Port according to this disclosure. The exemplary device 210 shown in FIG. 2 may be embodied in, for example, a single integral unit. Otherwise, portions of the exemplary device 210 shown in FIG. 2 may be housed individually externally to, but in wired communication with, the device 210 housing at least an interface circuit board 270 on which is mounted a circuit such as that shown in FIG. 1. The device 210 may be centered around the AIS interface circuit board 270.

The device 210 may include an external jack connection 260 by which an AIS connector, which is physically attached to the AIS Pilot Port may be connected to the device 210 to provide input from the AIS Pilot Port to the device 210 via the specific RS-422 signal lines, as discussed above.

The device 210 may be controlled by, and/or deliver data to, an integrated or external Bluetooth module 280, which is able to wirelessly communicate with the remote computer executing the monitoring program for monitoring the signals from the RS-422 connector, as discussed above.

The device 210 may include an internal battery or other internal power source 240. Otherwise, power may be provided to the device 210 via some manner of external power connection 240.

The device 210 may include a switching section 250 by which power to, or other functions of, the device 210 may be controlled. The switching section 250 may be configured to be as simple as and ON/OFF switch for controlling power to the device 210.

The device 210 may include a separate user interface 220 by which the user can interface with the device 210. The user interface 220 may be configured as any conventional mechanism that permits a user to effect an input to the device 210.

The device 210 include a display section 230, which may be configured as one or more conventional mechanisms that output information to the user, including a visual display, or one or more speakers, for alerting a user to operation of the device 210, and/or to status of the information output from the AIS Pilot Port as monitored and controlled by the exemplary circuit such as that shown in FIG. 1 and housed on the AIS interface circuit board 270 of the device 210.

All of the various components of the device 210, as depicted in FIG. 2, may be connected by one or more data/control busses 290. These data/control busses 290 may provide wired communication between the various components of the device 210, whether all of those components are housed integrally in, or are otherwise external and connected to, the device 210.

It should be appreciated that, although depicted in FIG. 2 as an integral unit, the various disclosed elements of the device 210 may be arranged in any combination of sub-systems as individual components or combinations of components, integral to a single unit, or external to, and in wired or wireless communication with the single unit of the device 210. In other words, no specific configuration as an integral unit or as a support unit is to be implied by the depiction in FIG. 2.

The disclosed embodiments may include a method for monitoring a signal emanating from and AIS Pilot Port and for adapting that signal from an incorrect form to a correct form with a device and/or a circuit that is locally placed and able to be remotely wirelessly monitored and controlled. The method may include applying power to the monitoring device or circuit. The method may include receiving an input raw data signal. The method may include converting the input raw data signal to a transistor-transistor logic level signal. The method may include correcting between a transmit signal and a receive signal error. The method may include monitoring output data signals. The method may include determining whether the monitored output data signals are in an inverted or non-inverted form. When a determination is made that the signal is in an inverted form, the method may cause a separate control signal to be asserted, which re-inverts the output data signals to a corrected orientation. The method may then display some indication to alert a user as to a particular status of the monitored output signals or of a device for controlling the monitored output signals.

Figure 3:
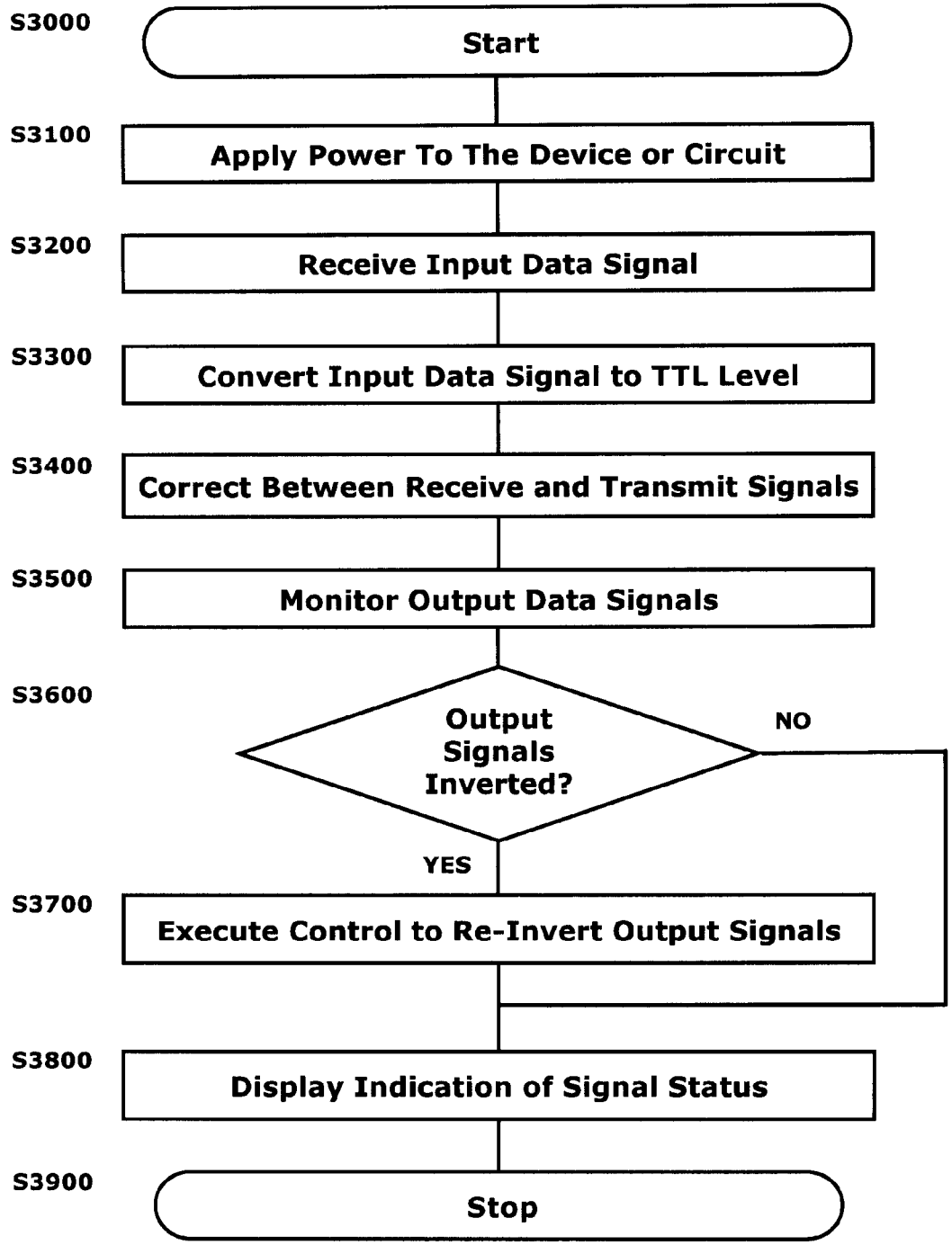
FIG. 3 illustrates a flowchart of an exemplary method for adapting an AIS Pilot Port with a device and/or a circuit according to this disclosure.

FIG. 3 illustrates a flowchart of an exemplary method for monitoring and adapting a signal emanating from an AIS Pilot Port with a device and/or a circuit. As shown in FIG. 3, operation of the method commences at Step S3000 and proceeds to Step S3100.

In Step S3100, the method may apply power to the device or circuit. Operation of the method proceeds to Step S3200.

In Step S3200, the method receives a raw data input signal. Operation of the method proceeds to Step S3300.

In Step S3300, the method converts the received raw data input signal to a transistor-transistor logic level signal. Operation of the method proceeds to Step S3400.

In Step S3400, a correction may be executed between a transmit signal and a receive signal. Such a correction may involve exclusively OR-ing the transmit and receive lines through an exclusive OR gate. Operation of the method proceeds to Step S3500.

In Step S3500, output data signals are monitored. Operation of the method proceeds to Step S3600.

Step S3600 is a determination step. In Step S3600, the method determines whether the monitored output data signals are in an inverted state or a non-inverted state. If, in Step S3600, it is determined that the monitored output data signals are in a non-inverted state, operation of the method proceeds to Step S3800.

If, in Step S3600, it is determined that the monitor output data signals are in an inverted state, operation of the method proceeds to Step S3700.

In Step 3700, the method executes a control routine to re-invert the output data signals. Such a control routine may automatically assert a signal on a control line to re-invert the output signals via a second exclusive OR gate. Operation of the method proceeds to Step S3800.

In Step S3800, the method may display some indication as to the status of the monitored output data signals and/or an indication of execution of a required re-inversion. Operation of the method proceeds to Step S3900 where operation of the method ceases.

The disclosed embodiments may include a non-transitory computer-readable medium storing instructions which, when executed by a processor, may cause the processor to execute the steps of the above-discussed method in wired, or preferably wireless, communication with an adaptive monitoring device and/or circuit.

The above-described exemplary systems and methods referenced certain conventional components to provide a brief, general description of suitable communications, logic and processing environment in which the subject matter of this disclosure may be implemented for familiarity and ease of understanding. Embodiments of this disclosure may be provided, at least in part, in a form of hardware circuits, firmware or software computer-executable instructions to carry out the specific functions described, such as program modules, being executed by a processor, particularly to monitor and control the disclosed circuit through wireless communication with the circuit. Generally, individual computer-executable program modules are understood to include routine programs, objects, components, data structures, and the like that perform particular tasks or implement particular data types.

Those skilled in the art will appreciate that other embodiments may be practiced in communication network environments with many types of communication equipment and computer system configurations, in communication with an AIS Pilot Port and that the pilot's PPU may be a personal computer, a hand-held device such as a personal data assistant or tablet device, a multi-processor system, microprocessor-based or programmable consumer electronics, and the like.

Embodiments within the scope of the present disclosure may also include computer-readable media having stored computer-executable instructions or data structures that can be accessed, read and executed by the PPU or other remote computer device using a compatible wired or wireless data reader. Such computer-readable media can be any available media that can be accessed by a processor, general purpose or special purpose computer in, or in communication with, the pilot's PPU. By way of example, and not limitation, such computer-readable media can comprise RAM, ROM, EEPROM, CD-ROM, flash drives, data memory cards or other analog or digital data storage device that can be used to carry or store desired program elements or steps in the form of accessible computer-executable instructions or data structures. Information may be transferred or provided over a network or another communications connection, whether wired, wireless, or in some combination of the two, such that the receiving processor in, for example the pilot's PPU, properly views the connection as a computer-readable medium. Thus, any such connection is properly termed a computer-readable medium. Combinations of the above should also be included within the scope of the computer-readable media for the purposes of this disclosure.

Although the above description may contain specific details, they should not be construed as limiting the claims in any way. Other configurations of the described embodiments of the disclosed systems and methods are part of the scope of this disclosure. In other words, there may be multiple instances of the components each processing the content in various possible ways. Accordingly, the appended claims and their legal equivalents should only define the disclosure, rather than any specific examples given.

I claim:

1. A method for remotely monitoring and modifying a signal in a radio interface, comprising:
    monitoring raw transmit and receive signals with a circuit;
    converting the raw transmit and receive signals to transistor-transistor logic (TTL) level signals in the circuit;
    processing the TTL level signals to isolate the TTL level signal representing the raw transmit signal from the TTL level signal representing the raw receive signal;
    electronically manipulating the respective isolated TTL level signals to ensure that a correct one of a transmit or receive TTL level signal is presented;
    monitoring an output TTL level signal from the circuit to determine whether the output TTL level signal is in an inverted or non-inverted state; and
    when the monitoring determines that the output TTL level signal is in an inverted state, electronically manipulating the output TTL level signal in the circuit to re-invert the output TTL level signal,
    wherein a remote computer in wireless communication with the circuit automatically executes at least the monitoring the output TTL level signal and the electronically manipulating the output TTL level signal.

2. The method of claim 1, wherein the raw transmit and receive signals are obtained via a radio interface port that comprises at least inputs corresponding to a balanced pair of differential lines for each of the raw transmit and receive signals.

3. The method of claim 2, wherein the radio interface port is a pilot interface port in communication with an Automatic Identification System (AIS) radio in a maritime vessel.

4. The method of claim 1, wherein the processing the TTL level signals to isolate the TTL level signal representing the raw transmit signal from the TTL level signal representing the raw receive signal comprises exclusively OR-ing the respective TTL level signals through a first exclusive OR gate in the circuit.

5. The method of claim 1, wherein the electronically manipulating the output TTL level signal in the circuit to re-invert the output TTL level signal comprises the remote computer directing assertion of a control signal in a second exclusive OR gate from which the output TTL level signal is output.

6. The method of claim 5, wherein the remote computer wirelessly communicates with a wireless interface module electronically wired to the circuit and the asserted control signal is input into the circuit by the wireless interface module on direction from the remote computer.

7. The method of claim 1, further comprising displaying a status of at least one of the circuit or the output TTL level signal via a display device in wired communication locally with the circuit.

8. The method of claim 7, wherein the display device provides at least one of an audio or visual signal to a user.

9. A non-transitory computer-readable medium storing instructions which, when executed by the remote computer, cause the remote computer to control the circuit to execute the method of claim 1.

10. A circuit for remotely monitoring and modifying a signal in a radio interface, comprising:
    inputs that input raw transmit and receive signals into the circuit;
    transistor-transistor logic (TTL) gates that convert the raw transmit and receive signals to TTL level signals;
    a first exclusive OR gate to which a TTL level signal representing the raw transmit signal and a TTL level signal representing the raw receive signal are fed;
    a second exclusive OR gate to which an output of the first exclusive OR gate is fed; and
    a control signal input via which a control signal is fed to the second exclusive OR gate,
    wherein an output TTL level signal from the second exclusive OR gate is monitored by a remote computer in wireless communication with the circuit to determine whether the output TTL level signal is in an inverted or non-inverted state; and
    when the remote computer determines that the output TTL level signal is in an inverted state, the remote computer asserts the control signal via the control line to the second exclusive OR gate to re-invert the output TTL level signal.

11. The circuit of claim 10, wherein the raw transmit and receive signals are input to the circuit via a radio interface port that comprises at least inputs corresponding to a balanced pair of differential lines for each of the raw transmit and receive signals.

12. The circuit of claim 11, wherein the radio interface port is a pilot interface port in communication with an Automatic Identification System (AIS) radio in a maritime vessel.

13. The circuit of claim 10, wherein the remote computer wirelessly communicates with a wireless interface module electronically wired to the circuit and the asserted control signal is input into the circuit by the wireless interface module.

14. A device for remotely monitoring and modifying a signal in a radio interface, comprising:
    a circuit according to claim 10;
    an input interface via which the raw transmit and receive signals are input into the circuit;
    a wireless interface module via which the device communicates with the remote computer; and at least one of a power source or power connection via which the circuit is electrically powered.

15. The device of claim 14, wherein the input interface is a wired connection to a radio interface port that comprises at least inputs corresponding to a balanced pair of differential lines for each of the raw transmit and receive signals.

16. The device of claim 15, wherein the wired connection connects the device to a pilot interface port in communication with an Automatic Identification System (AIS) radio in a maritime vessel.

17. The device of claim 14, wherein the remote computer wirelessly communicates with the wireless interface module to (1) monitor the output TTL level signal from the circuit, (2) determine if the output TTL level signal is inverted, and (3) cause the wireless interface module to assert the control signal.

18. The device of claim 14, wherein the wireless interface module is a Bluetooth module.

19. The device of claim 18, wherein the Bluetooth module provides power to the device via the power connection.

20. The device of claim 14, further comprising a display that displays a status of at least one of the circuit, the device and the output TTL level signal.

21. The device of claim 20, wherein the display device provides at least one of an audio or visual signal to a user.

* * * * *